United States Patent [19]

Kjeldsen

[11] Patent Number: 4,693,645
[45] Date of Patent: Sep. 15, 1987

[54] THREE-DIMENSIONAL DUPLICATING MILLING MACHINE

[76] Inventor: Ingomar Kjeldsen, Conrad Holmbos veg 44, N-9000 Tromso, Norway

[21] Appl. No.: 880,274

[22] Filed: Jun. 30, 1986

[63] Continuation of PCT No 85/00063 filed Oct. 7, 1985, published as WO86/02864 on May 22, 1986.

[30] Foreign Application Priority Data

Nov. 5, 1984 [NO] Norway .................................. 844378
Oct. 7, 1985 [WO] PCT Int'l Appl. .................. PCT/NO85/00063

[51] Int. Cl.[4] .............................................. B23C 1/16
[52] U.S. Cl. ......................................... 409/86; 409/89
[58] Field of Search ................... 409/97, 103, 110, 121, 409/124, 125, 90, 89, 86, 93; 33/25 R, 25 B, 24 R, 24 C; 144/144 R, 144 A

[56] References Cited

U.S. PATENT DOCUMENTS

| | | | |
|---|---|---|---|
| 361,131 | 4/1887 | Carlinet | 409/90 X |
| 885,428 | 4/1908 | Brierley | 409/89 |
| 1,039,712 | 10/1912 | Eaton | 409/86 |
| 1,472,034 | 10/1923 | Asquith | 409/90 X |
| 1,551,648 | 9/1925 | Eaton | 409/92 |
| 1,959,269 | 5/1934 | Gorton | 409/121 |
| 2,018,697 | 10/1935 | Zwick | 409/89 |
| 2,293,100 | 8/1942 | Baumgold | 409/86 X |
| 2,426,156 | 8/1947 | Schabot | 409/86 X |
| 2,689,505 | 9/1954 | Ossenbach | 409/89 |
| 2,857,821 | 10/1958 | Nelson | 409/130 |
| 3,548,710 | 12/1970 | Kaplan | 409/186 |
| 3,584,535 | 6/1971 | Rossberger | 409/89 |
| 4,604,007 | 8/1986 | Hall et al. | 409/89 |

FOREIGN PATENT DOCUMENTS

| | | | |
|---|---|---|---|
| 46368 | 3/1889 | Fed. Rep. of Germany | 409/89 |
| 64298 | 9/1892 | Fed. Rep. of Germany | 409/89 |
| 413326 | 5/1925 | Fed. Rep. of Germany | 409/93 |

OTHER PUBLICATIONS

"Manual for Iron and Metal Industry" 1948 pp. 913–914, Vilhelm Jorgensen.

Primary Examiner—William R. Briggs
Attorney, Agent, or Firm—Barnes & Thornburg

[57] ABSTRACT

The invention relates to a duplicating milling-machine which operates simultaneously in the horizontal and vertical planes. This is achieved according to the present invention in that, in the centric three-dimensional duplicating milling-machine, the table for the original is positioned vertically over the cutting table, and by the addition of a dual-displacement arm which rotates around a vertical column. On this column is mounted a universal milling-machine which is linked to a feeler by means of a coordinator arm. The cutting tool and the feeler are mounted centrally above one another and the transfer of the original is effected in full scale.

7 Claims, 5 Drawing Figures

THREE-DIMENSIONAL DUPLICATING MILLING MACHINE

This is a continuation of co-pending PCT application NO 85/00063 filed Oct. 7, 1985.

The invention relates to a duplicating milling-machine which operates simultaneously in the horizontal and vertical planes.

If one wishes to duplicate ornaments or decorations, duplication may be affected manually by looking at the original and reproducing what one sees on a blank until one obtains a piece as near identical to the original as possible. Duplication may also be effected more or less automatically when an operator guides a feeler over the contours of the original, and the movements of the feeler as it follows these contours are reproduced by a cutting tool.

Such duplicating milling-machines are used to reproduce ornaments, sculptures, lettering or similar decorations, and reproduction may be effected on wooden, plastic or metal blanks.

The duplicators in use today are complex and costly machines, and only larger companies and companies who make ornament duplication their sole business use such machines. Such a machine is described in "Jern-og Metallindustriens Handbok" (Manual for Iron and Metal Industry) No. 2, page 913, by Vilhelm Jorgensen, published by Ivar Kobenhavn 1948. This description shows that the machine is of complex design and operation, due to the position of the table for the original in relation to the cutting table, as this position allows no possibility for three-dimensional duplication in one single operation.

In DE-A No. 413,326, a duplicating machine is described which operates in one plane only, i.e. in two dimensions. A feeler which can be guided over the surface to be reproduced is vertically connected to a cutting tool, but can rotate freely around its vertical axis. The cutting tool is connected to a driving wheel through a friction coupling.

A three-dimensional duplicating device is described in DE-A No. 46,368. In this case, a feeler is fixed to a horizontal arm and the cutting tool is on a separate arm. Both arms are horizontal and interconnected by means of a bar. The device formed by both arms and the bar can effect slight vertical movements along a bracket. In addition, the device is balanced by means of a lever and weight. Horizontal displacement is made possible by the two axes around which the device rotates.

All known machines devised for three-dimensional duplication are specialized machines, often complex and expensive, and therefore rather unsuitable for hobby use. For the device described in DE-A No. 46,368, the design is such that ease of movement and precision are difficult to achieve simultaneously because of the drive system used.

The present invention aims at providing additional equipment for the universal hand milling machines which are now sold on the market at reasonable price, and aims also at achieving adequate precision for reproduction of an original. A combined vertical-horizontal arm renders the vertical slide-bar device described in DE-A No. 46,368 superfluous. Such a slide-bar device causes a substantial amount of friction. Also, a duplicator which gives a much larger vertical working space than any known machine is thus achieved.

This is achieved according to the present invention in that, in the centric three-dimensional duplicating milling-machine, the table for the original is positioned vertically over the cutting table, and by the addition of a dual-displacement arm which rotates around a vertical column. On this column is mounted a universal milling-machine which is linked to a feeler by means of a coordinator arm. The cutting tool and the feeler are mounted centrally above one another and the transfer of the original is effected in full scale.

Further details of the invention appear in FIGS. 1, 2, 3, 4 and 5, and the following description.

Figure 1:
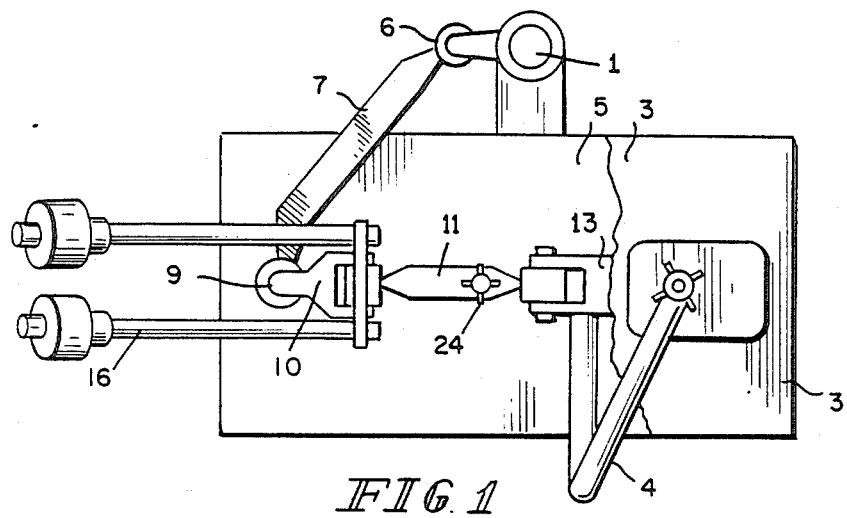
FIG. 1 shows a plan of the machine.
Figure 3:
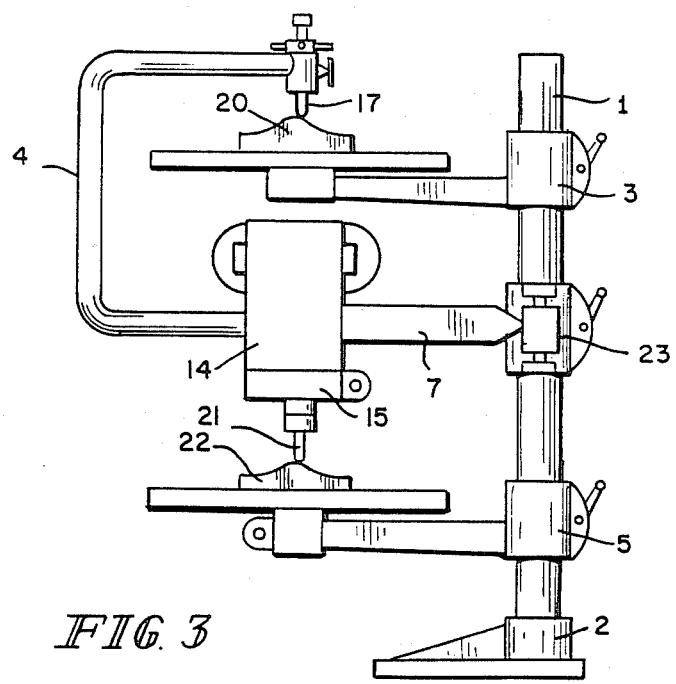
FIGS. 3 and 4 show two different elevation views of the machine.
Figure 2:
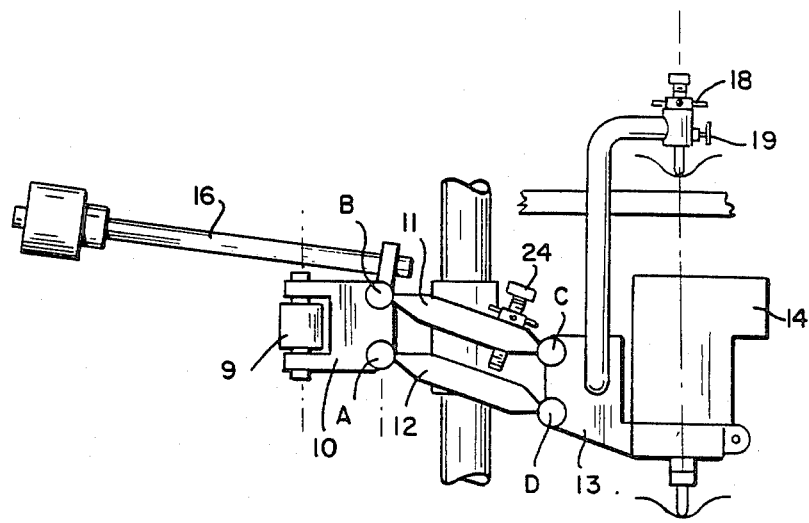
FIG. 2 shows details of the vertical counterweight system of the outer section $7^2$ of the combination arm 7.
Figure 4:
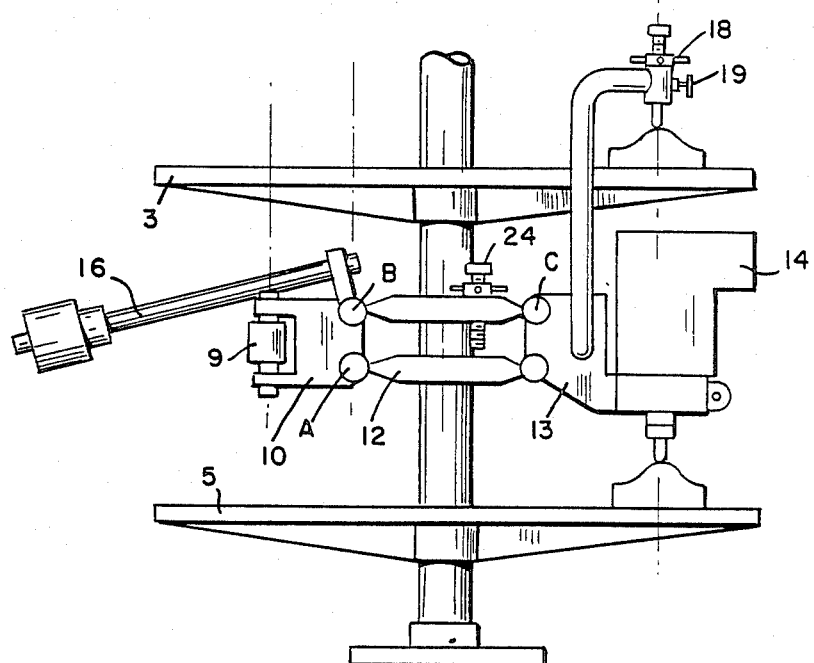
Figure 5:
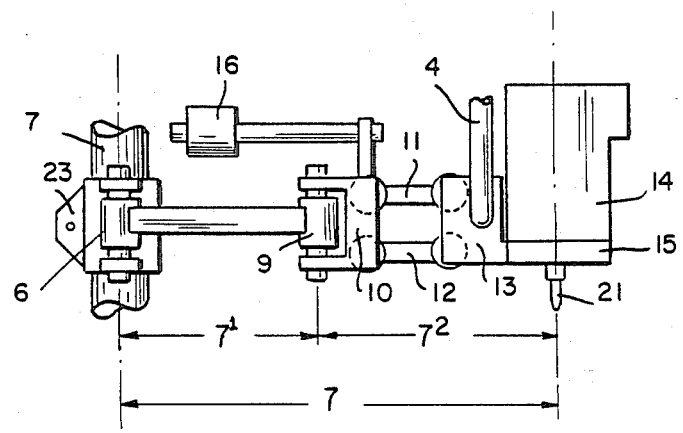
FIG. 5 shows the combination arm 7 in the extended position with the inner section $7^1$ and the outer section $7^2$.

The three-dimensional duplicating milling-machine consists of a column 1 and a base-plate 2. The column 1 is equipped with an upper horizontal table 3 for the original and a lower horizontal cutting table 5.

Between these two tables, a combination arm 7 is mounted. The table 3 for the original, the cutting table 5 and the combination arm 7 can be moved vertically and horizontally on the column 1 as they are mounted on said column with split-bushings 3, 23, 5.

The combination arm 7 consists of two sections, an inner section $7^1$ and an outer section $7^2$. The inner section $7^1$ consists of an articulated arm with two horizontal articulations, a first articulation 6 and a second articulation 9, while the outer section $7^2$ of the combination arm 7 consists of a vertical double articulation 10, 11, 12, 13 and of a support 15 for the machine.

The axes A-B, C-D, A-D, B-C passing through centres A, B, C, D of the section arms 11, 12 which are positioned vertically one above the other, form together a parallelogram where axes A-B and C-D will always remain vertical, and consequently so will a cutting tool 21.

A cross-articulation bracket 10 can effect a horizontal displacement by means of second articulation 9 and the milling-machine 14 will always be mobile in all planes under the operator's control.

By means of a coordinator arm 4, the movements of a feeler 17, which follows the original's contours, are transferred to a cutting tool 21 and the combination arm 7. This coordinator arm 4 is U-shaped to be able to move clear of the table 3 for the original. Its lower extremity is linked to the combination arm 7 through bracket 13.

At the upper extremity of the coordinator arm 4, a feeler 17 is fixed, positioned above the table for the original. The feeler is vertically adjustable and is always on the same centre line as the cutting tool 21. The feeler regulates the cutting depth for the cutting tool by means of an adjustable screw 18 which lifts or lowers the feeler.

To balance the weight of the milling-machine 14, of the coordinator arm 4 and of the outer section $7^2$ of the combination arm, and thus eliminate surface pressure from the feeler 17 against the original 20, an adjustable counterweight 16 is fixed to the section arm 11 at point B.

When starting the milling-machine 14 and guiding the feeler 17 over the surface of the original 20, the manually induced displacement of the feeler 17 will be transferred through the U-shaped coordinator arm 4 to the outer section $7^2$ of the combination arm 7, and through the vertical double articulation 10, 11, 12, 13 and the horizontal articulation 9. The machine is thus capable of both vertical and horizontal displacements.

Through the inner section $7^1$ of the combination arm and the first articulation 6, the machine effects horizontal displacements only.

An adjustable retaining screw 24 regulates the cutting depth on the blank.

By following the procedure described above, an exact duplicate of the original 20 will be obtained on blank 22.

All machine components are attached to the column 1 by means of split-bushings, either directly or indirectly. Assembly and dismantling of the machine are therefore uncomplicated operations.

What is claimed is:

1. Centric three-dimensional duplicating milling-machine having a table (3) for the original and a cutting table (5), (4), counterweight bars (16), a milling-machine (14) with a cutter, a feeler and a coordinator arm connected between the feeler and milling machine, (17), characterized in that the table (3) for the original and the cutting table (5) are mounted on a column (1), and a combination arm (7) is mounted on the same column between the two tables and has an inner section ($7^1$) with a first articulation (6) and a second articulation (9), and an outer section ($7^2$) consisting of a cross-articulation bracket (10) where two horizontal pivots (A,B) are positioned vertically above each other and on which respectively an upper arm (11) and a lower arm (12) are pivoted in a vertical plane, and further, the other extremity of the upper arm (11) is pivoted in a vertical plane to a bracket (13) by means of a third pivot (C) while the other extremity of the lower are (12) is pivoted in a vertical plane to said bracket by means of a fourth pivot (D) while said bracket (13) comprises a clamp which holds the milling-machine (14).

2. Centric three-dimensional duplicating milling-machine according to claim 1, characterized in that the table (3) for the original, the cutting table (5) and the combination arm (7) are mounted onto the column (1) by means of adjustable split-bushings (3, 23, 5).

3. Centric three-dimensional duplicating milling-machine according to claim 1, characterized by a coordinator arm (4) which is U-shaped and fixed to the bracket (13) at one extremity while at the other extremity the feeler (17) is attached.

4. Centric three-dimensional duplicating milling-machine according to claim 1, characterized in that the feeler (17) is equipped with an adjustable screw (13).

5. Centric three-dimensional duplicating milling-machine according to claim 1, characterized in that the upper arm (11) is equipped with an adjustable retaining screw (24).

6. Centric three-dimensional duplicating milling-machine according to claim 1, characterized in that on the upper arm (11) and pivoting around the axis (A) are found counterweight bars (16) with counterweights.

7. Centric three-dimensional duplicating milling-machine according to claim 1, characterized in that the feeler (17) is positioned on the same centre line as the cutting tool (21).

* * * * *